United States Patent [19]

Foreman

[11] 4,316,447
[45] Feb. 23, 1982

[54] STEAM COOKING APPARATUS

[76] Inventor: Dave O. Foreman, 606 E. Broadway, Andrews, Tex. 79714

[21] Appl. No.: 99,842

[22] Filed: Dec. 3, 1979

[51] Int. Cl.³ .................... F24D 1/00; A47J 27/06; B65D 90/04
[52] U.S. Cl. .................... 126/369; 126/377; 165/185; 99/467; 220/428
[58] Field of Search .................... 126/348, 369.2, 369.1, 126/369, 375, 376, 377, 378, 381, 382, 389; 220/428; 219/440; 165/185; 99/347, 532, 533, 467, 483

[56] References Cited

U.S. PATENT DOCUMENTS

| | | | |
|---|---|---|---|
| 713,154 | 11/1902 | Richardson | 126/377 |
| 776,025 | 11/1904 | Hillman | 126/377 |
| 1,299,267 | 4/1919 | Tiers | 126/369 X |
| 1,330,868 | 2/1920 | Harrison | 220/428 X |
| 2,628,738 | 2/1953 | Hilldale | 126/369 X |
| 3,280,907 | 10/1966 | Hoffman | 165/185 |
| 3,584,683 | 6/1971 | Gordon | 165/185 |

*Primary Examiner*—Samuel Scott
*Assistant Examiner*—Randall L. Green
*Attorney, Agent, or Firm*—Marcus L. Bates

[57] ABSTRACT

A food container apparatus for use in combination with a pressure cooker which enables food to be cooked with steam, while concurrently the food is browned on the upper surface thereof. The food container apparatus is received within an upwardly opening pressure cooker, with there being a boiler formed between the bottom of the food container and the bottom of the pressure cooker, and a vapor space formed between the top of the food container and the lid of the pressure cooker. An annular area is formed about the outer periphery of the food container and communicates the vapor chamber with the boiler so that steam generated at the bottom of the pressure cooker flows towards the vapor chamber in heat transfer relationship respective to the food container, and is exhausted through the pressure regulator located in the lid. A heavy heating plate at the top of the food container prevents condensation of steam from admixing with the contents thereof, and at the same time provides a heat sink. The lid is preheated to a suitable elevated temperature prior to being placed into position at the upper end of the food container, thereby providing sufficient radiant heat to brown the upper surface of the food contained within the food container, thereby rendering the food more appetizing and tasteful. The heat sink is apertured so that heating rods can be placed therein whenever it is necessary to transfer additional heat into the center of the food mass contained within the food container.

9 Claims, 5 Drawing Figures

U.S. Patent     Feb. 23, 1982     4,316,447
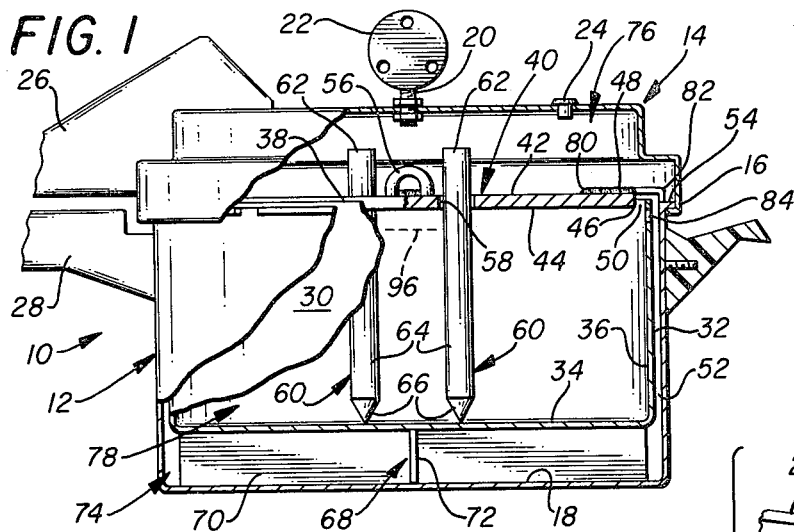
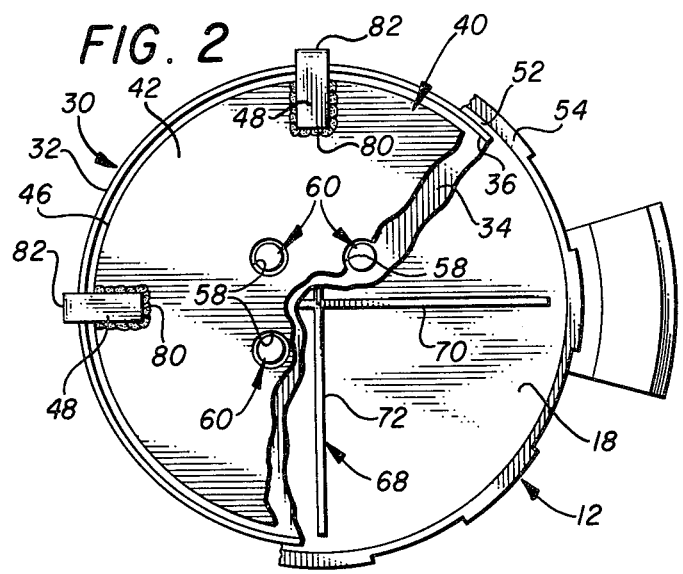
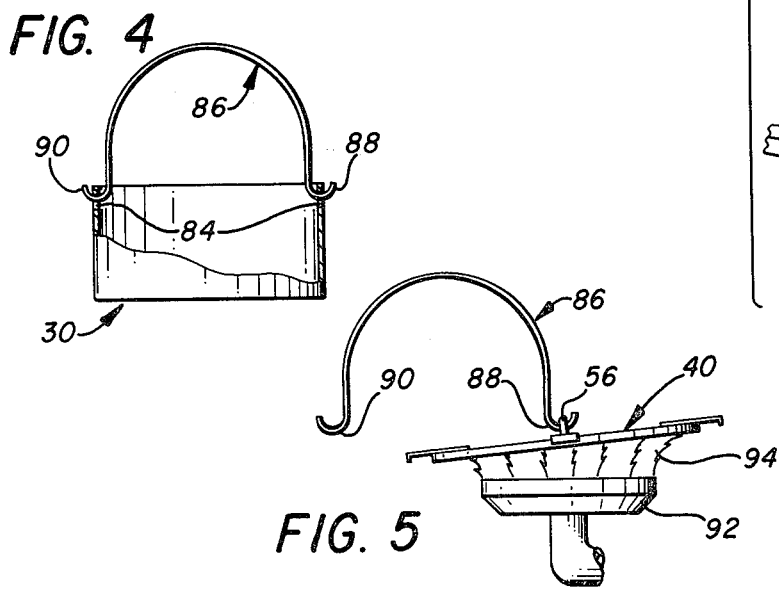
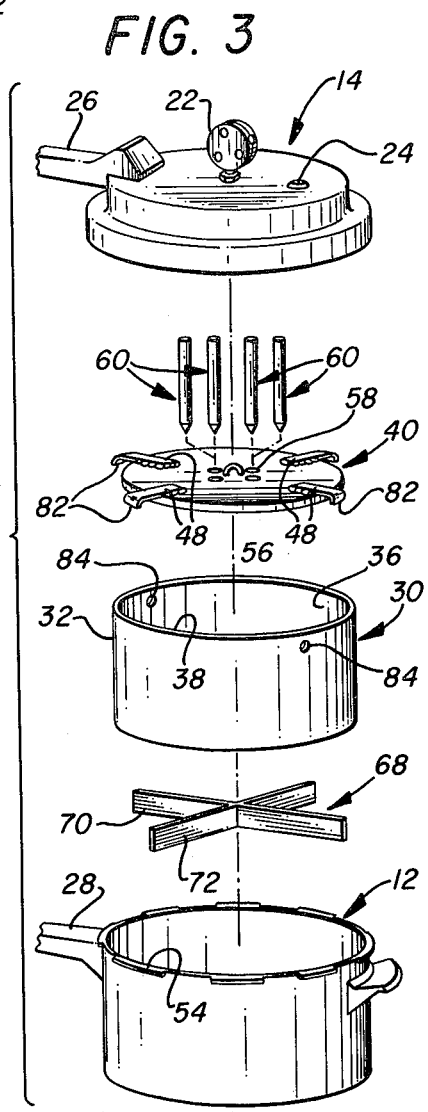

STEAM COOKING APPARATUS

BACKGROUND OF THE INVENTION

Most families have at least one pressure cooker in the kitchen. When the pressure cooker is initially obtained, all sorts of foodstuff are cooked, but after a few weeks of use, interest in the pressure cooker is lost, and the cooker is stored and seldom emerges from the kitchen cabinet extept for an occasional, hurried dish of meat or vegetables. One reason for this lack of use of the pressure cooker lies in the difficulty involved in cleaning the lid, gasket, and the coacting fastener means. Others feel that the high pressure steam exhausting into the atmosphere substantially reduces the flavor of the food. Still others feel that large food masses are difficult to uniformly cook throughout the food, while still others object to the resultant starchy mess which often accumulates in the bottom of the cooker when pasta and the like is cooked. There is also an objection to the appearance of the upper surface of many foodstuffs because it is not properly browned, especially with dishes such as pastas and cobblers. Therefore, many cooks abandon the advantages of the pressure cooker because of these many drawbacks.

It would be desirable to be able to steam cook cobblers, custards, casseroles, pot pies, roasts, pastas, baked potatoes, stews, stuffed peppers, chile, and all sorts of other magnificent foods without the above recited disadvantages. The present invention provides a new method of steam cooking food which avoids the above drawbacks presently associated with the ordinary pressure cooker. An apparatus which enables these desirable cooking attributes to be realized is the subject of the present invention.

There are many foods which cannot be satisfactorily prepared in a standard pressure cooker, such as the following examples: meat loaf, western goolash, San Antonio style chili (extra thick and meaty), peach cobbler, fresh apple cobbler, rhubarb cobbler, cherry cobbler, sweet potato cobbler, stuffed bellpeppers, Chinese rice casserole, swiss steak, bean and jalepena casserole, tuna casserole, chicken pot pie, beef pot pie, Mexican casserole, rice pudding, chicken and noodle casserole, baked white potatoes, baked sweet potatoes, beef chowmein, pork chow mein, chicken chow mein, meat balls and spaghetti, chili rellenos, beef and vegetable casserole, chicken and dressing and ranch style beans.

One unexpected and unobvious result gained by the use of the present invention is the capability of satisfactorily cooking the above listed foodstuffs.

SUMMARY OF THE INVENTION

Method and apparatus for cooking, wherein food is enclosed within a container, and the food is heated by placing a boiler at the bottom thereof, so that steam heat envelops the entire exterior of the container as the steam flows into a vapor space located thereabove. Steam condensate is prevented from mixing with the contents of the container by the provision of a special heating plate. The plate enables the food stored within the container to be heated until the uppermost surface thereof has achieved a suitable browned appearance.

The above method is carried out by the provision of an upwardly opening food container of a size to be received within an upwardly opening cooker body of an ordinary pressure cooker. The food container is of a size which forms an annulus between the outer wall thereof and the inner wall of the pressure cooker. Spacer means supports the food container in spaced relationship respective to the bottom of the pressure cooker, thereby forming a boiler.

The food container includes a heavy, removable heating plate which substantially covers most of the opening thereof, thereby preventing steam condensation from being admixed within the food contained therewithin.

The boiler generates steam which heats the bottom of the food container. The steam flows from the boiler, up through the annulus, into the vapor space, where excess steam is vented into the atmosphere by means of the usual pressure regulator. Accordingly, the food mass is uniformly steam heated about its entire outer surface area.

The cover plate is made of metal and is of sufficient mass to form a heat sink so that the plate can be placed on a burner of the stove, elevated in temperature, so that when it is placed on the container to close the opening therein, the food is subjected to an elevated temperature of sufficient magnitude to brown the upper surface thereof.

The cover plate is apertured, and radially spaced cooking rods are received in close tolerance relationship therethrough so that the rods can be extended from the vapor chamber, into the food mass, thereby causing transfer of heat from the cover plate and vapor space towards the central mass of the food contained within the food chamber.

A primary object of the present invention is the provision of a method by which an ordinary steam cooking apparatus can be employed together with the improvement of the present invention to enable steam cooking to be carried out in the home in a new and different manner.

A further object of this invention is the provision of apparatus for simultaneously steam cooking and browning food products.

Another and still further object of the present invention is the provision of a combination of a prior art steam cooker and a novel food container apparatus which enables most foodstuffs to be simultaneously steam cooked and browned.

A still further object of this invention is the provision of a new combination which involves a prior art pressure cooker and a new food container, wherein the combination forms a boiler underlying the food container with there being an annulus formed about the food container which communicates with a vapor space located above the food container, so that the food is isolated within the food container where it is cooked by the steam which envelops all the surfaces thereof, and wherein any steam condensate from the vapor space is prevented from admixing with the foodstuff.

These and various other objects and advantages of the present invention will readily become apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a broken, part cross-sectional, elevational view of a new combination made in accordance with the present invention;

FIG. 2 is a broken, top plan view of the apparatus disclosed in FIG. 1, with some parts being broken away therefrom in order to illustrate the interior thereof;

FIG. 3 is an exploded view of the apparatus disclosed in FIGS. 1 and 2;

FIG. 4 is a reduced, isolated, side view of part of the apparatus disclosed in the foregoing figures; and, FIG. 5 is a reduced, side elevational view which illustrates the use of part of the apparatus disclosed in some of the foregoing figures.

DETAILED DESCRIPTION OF THE PREFERRED EMBODIMENT

In FIG. 1 there is disclosed a steam cooking apparatus 10 made in accordance with the present invention. The apparatus includes a pressure cooker having a cooker body 12 and a lid 14, made in accordance with the prior art. The usual releasable fastener and sealing ring assembly 16 circumferentially extends about the outwardly directed flange and lip assembly. The cooker bottom is seen illustrated at 18, and a vent pipe 20 is affixed to the lid so that a pressure regulator 22 can be supported thereon in the usual manner. A pop off valve 24, upper handle 26, and lower handle 28 can take on any number of different forms.

According to the present invention, a novel food container 30 forms an enclosure comprised of a pot 32 having a pot bottom 34, and a circumferentially extending sidewall 36 which terminates in an upper peripheral edge 38. A heating cover 40 has an upper face 42, a lower face 44, and a peripheral edge portion 46.

Radial support members 48 form a bridge which extends from attached relationship respective to a marginal peripheral edge portion of the cover into overlying relationship respective to upper edge 38 of the pot.

The outer surface of the pot is spaced from the inner surface of the cooker body to form a narrow annulus 50. The annulus extends about the entire inside peripheral wall surface of the food container.

The upper edge 54 of the cooking body preferably is located intermediate the spaced horizontal planes formed by upper and lower faces of the heating plate.

Lifting ring 56 is attached centrally to the heating plate or cover. A plurality of radially spaced apertures 58 are formed vertically through the heating cover into which there is slidably received in a telescoping manner a plurality of heat transfer rods with there being one rod for each of the radially spaced apertures. The rods are each of a length to provide an upper marginal end portion 62 which extends above the surface of the heating cover, a lower marginal end portion 64 which extends into the interior of the food container, and a medial marginal length in heat contact relationship with the heating plate. The rods preferably are pointed as seen illustrated at 66.

A spacer in the form of a Maltese Cross 68 supports the bottom of the food container in spaced relationship respective to the bottom of the cooker body, thereby providing a boiler within which water can be boiled when the cooker bottom is heated sufficiently. The Maltese Cross includes members 70 and 72 arranged perpendicular to one another and intersecting at the midportion thereof. This forms a liquid chamber or boiler 74 which is spaced from a vapor chamber 76 formed within the cooker lid. The food container therefore forms an isolated cooking chamber 78 within which food to be cooked is stored.

The before mentioned bridge 48 includes an inner end 80 which terminates in welded relationship respective to the upper face of the heating cover; and, a free depending downwardly curved marginal end 82 which supportingly engages the before mentioned upper edge of the cooker body.

The food container is apertured at 180° spaced apart locations 84 so that a lifting bail 86 having hooks 88 and 90 formed in the marginal ends thereof can be inserted into the resultant holes for lifting the food container into and out of the cooker body.

In FIG. 5, there is disclosed a burner 92 having a flame 94 which heats the heating plate to an elevated temperature, for reasons which will be more fully appreciated as the remainder of this disclosure is more fully digested.

Numeral 96 indicates the "fill line" which preferably underlies the apertures 84 and which is within ½ inch of the lower face of the heating cover.

The heating cover is made of metal, preferably aluminum, and is ⅜–¾ inches in thickness. This metallic mass provides a sufficient heat sink whereby the plate can be placed on either a gas or electric burner 92 and the temperature thereof elevated to 200°–370° C. or 400°–700° F. The plate can then be lifted as seen illustrated in FIG. 5 into the position illustrated in FIG. 1 so that the upper surface of the foodstuff contained within the food container is subject to an elevated temperature which is in excess of the steam temperature formed in the boiler.

In operation, the cleaned disassembled apparatus is laid out for use, and the foodstuff is placed within cooking chamber until the surface thereof extends into proximity of apertures 84, as indicated by fill line 96. While the food is being placed within the cooking chamber, the Maltese Cross is placed in the bottom of the cooker body, and water is placed in the boiler part of the cooker body to a level which is below the top of the Maltese Cross. During this time, the heating cover has been placed on the burner of a stove and the temperature thereof increased to 400°–600° F., depending upon the composition and characteristics of the foodstuff contained within the food container.

The bail is attached to the food container in the manner of FIG. 4, and lifted into the illustrated position of FIG. 1, whereupon the bail can be removed from the container, and thereafter one end of the bail is used to engage the hook of the heating cover which is then placed into operative position of FIG. 1. The pressure cooker lid is next sealingly fastened to the cooker body, the pressure regulator positioned on the vent pipe, whereupon the cooking process commences.

As the water within the liquid chamber 74 is turned into steam, the steam flows up through the annulus 52 and into the vapor chamber 76, whereupon some of the steam is exhausted by the pressure regulator in order to maintain a constant predetermined temperature within the cooker. At this time, the heating cover is hotter than the steam, and accordingly, any steam impinging on the heating cover is super heated. At the same time, the heated lower face of the cover is closely adjacent to the upper surface of the foodstuff, and accordingly, the foodstuff is browned the appropriate amount. The small annular area 50 prevents significant transfer of heat from the cover into the upper peripheral edge of the food container. The bridge 48 transfers very little heat energy from the cover into the flange 54 of the cooker body. Accordingly, the heating cover requires a substantial amount of time for cooling down to the temperature of its environment.

The heating rods 62 are employed for cooking cobbler, roast, and other foodstuffs which are relatively dense and which are usually difficult to uniformly cook throughout its entire mass. The aperture 58 preferably loosely receives the cooking rod 64 so that very little heat transfer occurs between the heating cover and the rod, but instead the upper marginal end 62 is heated by the steam within the vapor chamber 76, with heat transfer occurring from the vapor chamber 76, into the upper marginal end 62 of the heating rod, and into the lower marginal end 64 of the heating rod, where the internal temperature of the foodstuff is elevated.

Steam condensate which heretofore is formed on the interior of the lid and drips into the food container to convert the foodstuff into a gelatinous mass is instead converted into dry steam.

Towards the end of the cooking process, after the pressure cooker has been removed from the burner, the dry steam will instead become saturated steam as the apparatus cools. This will cause condensation to occur on the inside surface of the lid 14, and some of the condensation will find its way into the interior of the food container. However, the amount of condensation is insignificant. Likewise, an insignificant amount of moisture will be lost by the foodstuff by means of egress through annulus 50, ports 84, and radial apertures 58. The accumulated moisture from condensation of the steam is not much greater than the moisture lost by the foodstuff. Accordingly, the material contained within the food container will not accumulate moisture and overflow into the annulus and run down into the boiler, as may otherwise be expected in the absence of the heating cover.

The present invention protects the flavor of the foodstuff because of the presence of the heating cover. Very little material is removed from the foodstuff and exhausted through the pressure regulator.

After an appropriate amount of time has expired for cooking the foodstuff to its optimum condition, the heat source which heats the boiler is removed, the entire pressure cooker apparatus cooled, the pressure regulator and lid is then removed, and the bail used to remove the cooking chamber from the cooker body. The lid is lifted with one end of the bail, and the food container can then be used as the serving dish, if desired. There is no need to scrub the cooker body and lid, but instead it can be easily wiped clean with a paper towel and stored until the next use because it is sterile and no foodstuff has contaminated the surface thereof. The food container and heating rods should all be washed, dryed, and stored in the cooker body until they are needed for the next process.

The present invention enables foodstuffs to be simultaneously steam cooked and browned in a new and different manner by the provision of apparatus made in accordance with the present invention. Pastas, cobblers, stews, casseroles, pot pies, and other similar foodstuff can be steam cooked to bring out an unusual taste and flavor, while at the same time the upper surface thereof attains a golden brown texture, all of which is pleasing to the eye and to the taste, and which is more nutritious and uniformly cooked than was heretofore possible.

The cooking container is filled almost to capacity and provides an extremely hygienic and nutritious method of cooking.

I claim:

1. In a pressure cooker having an upwardly opening cooker body to which there is removably affixed a lid, with seal means between the lid and body to provide a sealed enclosure, and a pressure regulator means by which the pressure within the sealed enclosure is regulated to a value above ambient, the improvement comprising:

an upwardly opening food container of a size to be received within said body, such that an annulus is formed between the body and the container; means supporting the container bottom in spaced relationship respective to the bottom of the body to form a boiler therebetween; a cover plate removably received at the upper end of said container for closing the opening in said container; said cover plate, said container, and said lid jointly form a vapor space above said cover plate;

said cover plate is a relatively thick heating plate which forms a heat sink so that the plate can be preheated to a temperature above 400° F. and subsequently placed into position whereupon the upper surface area of any food contained within the food container is heated;

said cover plate is provided with a plurality of apertures; an elongated heat conducting rod received through each of said apertures, such that one marginal end of said rod is disposed within said vapor space and the other marginal end thereof is disposed within said container;

whereby water can be placed within the boiler, the bottom of the cooker body elevated in temperature to cause the boiler to form steam, whereupon the steam flows up through the annulus, into the vapor space, and is exhausted through the pressure regulator to ambient without condensing onto the heated cover plate.

2. The improvement of claim 1 wherein said cover plate has a peripheral edge portion which is inwardly spaced from the sidewall of the container, thereby leaving an annular area between the plate and the container; radially spaced support members formed about the plate member which engage the upper edge of the cooker body and supports the plate, thereby reducing the rate by which heat is transferred from the cover plate into the container.

3. In a pressure cooker having an upwardly opening cooker body to which there is removably affixed a lid, with seal means between the lid and body to provide a sealed enclosure, and a pressure regulator means by which the pressure within the sealed enclosure is regulated to a value above ambient, the improvement comprising:

an upwardly opening food container of a size to be received within said body, such that an annulus is formed between the body and the container; means supporting the container bottom in spaced relationship respective to the bottom of the body to form a boiler therebetween; a cover plate removably received at the upper end of said container for closing the opening in said container; said cover plate, said container, and said lid jointly form a vapor space above said cover plate;

said cover plate is a relatively thick heating plate which forms a heat sink so that the plate can be preheated to a temperature above 400° F. and subsequently placed into position whereupon the upper surface area of any food contained within the food container is heated;

said cover plate has a peripheral edge portion which is inwardly spaced from the sidewall of the container, thereby leaving an annular area between the plate and the container; radially spaced support members formed about the plate member which engage the upper edge of the cooker body and supports the plate, thereby reducing the rate by which heat is transferred from the cover plate into the container;

whereby water can be placed within the boiler, the bottom of the cooker body elevated in temperature to cause the boiler to form steam, whereupon the steam flows up through the annulus, into the vapor space, and is exhausted through the pressure regulator to ambient without condensing onto the heated cover plate.

4. The improvement of claim 3 wherein said cover plate is provided with a plurality of apertures; an elongated heat conducting rod received through each of said apertures, such that one marginal end of said rod is disposed within said vapor space and the other marginal end thereof is disposed within said container.

5. In a pressure cooker having an upwardly opening cooker body and a lid removably affixed to the opening, wherein the lid sealingly engages the upper end of the cooker body to hermetically seal the enclosure from the ambient, and a pressure regulator means by which the temperature of the enclosure can be regulated; the combination with said pressure cooker of a food container;

said food container is upwardly opening and of a size to be received within said cooker body to leave an annulus between said cooker body and said food container; means forming a boiler space between the bottom of the cooker body and the bottom of the food container; means forming a vapor space between the top of the cooker body and the top of the food container;

a cover plate which removably covers the opening in the food container, and means forming an opening through which vapor can escape from the interior of the food container;

said cover plate is a relatively thick heating plate which forms a heat sink so that the plate can be preheated to a temperature above 400° F. and placed into position on the food container to heat the upper surface area of any food contained within the food container and to prevent condensation of steam from entering the food container;

said cover plate is provided with a plurality of apertures, an elongated heat conducting rod received through each said aperture, each said rod has one marginal end thereof disposed within said vapor space and the other marginal end thereof disposed within said container so that any food stored within the food container is elevated in temperature;

whereby water is placed in the boiler and heated to the boiling point, steam flows up the annular area to the vapor space, thereby heating the entire food container.

6. The combination of claim 5 wherein said cover plate has a peripheral edge portion which is spaced from the sidewall of the container, thereby leaving an annular area between the plate and the container; radially spaced support members formed about the plate member which engage an upper part of the cooker body and supports the plate, thereby reducing the rate of heat transfer from the plate into the container.

7. In a pressure cooker having an upwardly opening cooker body and a lid removably affixed to the opening, wherein the lid sealingly engages the upper end of the cooker body to hermetically seal the enclosure from the ambient, and a pressure regulator means by which the temperature of the enclosure can be regulated; the combination with said pressure cooker of a food container;

said food container is upwardly opening and of a size to be received within said cooker body to leave an annulus between said cooker body and said food container; means forming a boiler space between the bottom of the cooker body and the bottom of the food container; means forming a vapor space between the top of the cooker body and the top of the food container;

a cover plate which removably covers the opening in the food container, and means forming an opening through which vapor can escape from the interior of the food container;

said cover plate is a relatively thick heating plate which forms a heat sink so that the plate can be preheated to a temperature above 400° F. and placed into position on the food container to heat the upper surface area of any food contained within the food container and to prevent condensation of steam from entering the food container;

said cover plate is provided with a plurality of apertures, an elongated heat conducting rod received through each said aperture, each said rod has one marginal end thereof disposed within said vapor space and the other marginal end thereof disposed within said container so that any food stored within the food container is elevated in temperature;

whereby water is placed in the boiler and heated to the boiling point, steam flows up the annular area to the vapor space, thereby heating the entire food container.

8. The combination of claim 7 wherein said cover plate is provided with a plurality of apertures, an elongated heat conducting rod received through each said aperture, each said rod has one marginal end thereof disposed within said vapor space and the other marginal end thereof disposed within said container so that any food stored within the food container is elevated in temperature.

9. The combination of claim 7 wherein said cover plate is a relative thick mass of metal which can store a relative large amount of heat, said cover plate has a peripheral edge portion which is spaced from the sidewall of the container, thereby leaving an annular area between the plate and the container; radially spaced support members formed about the plate member which engage an upper edge portion of the cooker body and supports the plate, thereby reducing the rate of heat transfer from the plate into the body;

whereby when said cover plate is heated above the temperature of the water in the boiler, and placed on the container, steam condensation is prevented from accumulating in proximity of the vapor space and therefore water will not comingle with any food which may be contained within the container.

* * * * *